(12) United States Patent
Muteau et al.

(10) Patent No.: US 7,479,246 B2
(45) Date of Patent: Jan. 20, 2009

(54) OVERMOULDING

(75) Inventors: Stehane Muteau, Molsheim (FR); Philippe Fahrner, Molsheim (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 11/152,007

(22) Filed: Jun. 14, 2005

(65) Prior Publication Data
US 2006/0008615 A1    Jan. 12, 2006

(30) Foreign Application Priority Data
Jun. 21, 2004    (GB) ................. 0413809.5

(51) Int. Cl.
*B29C 45/14*    (2006.01)
(52) U.S. Cl. ................. 264/273; 264/218; 264/225; 264/274; 264/319
(58) Field of Classification Search ............... 264/273, 264/274
See application file for complete search history.

(56) References Cited

U.S. PATENT DOCUMENTS

| | | |
|---|---|---|
| 3,162,086 A | 12/1964 | Wells et al. |
| 3,851,794 A | 12/1974 | Hehl |
| 3,868,796 A | 3/1975 | Bush |
| 4,463,870 A | 8/1984 | Coburn, Jr. et al. |
| 4,593,449 A | 6/1986 | Meray-Hovarth et al. |
| 4,610,836 A | 9/1986 | Wycech |
| 4,751,249 A | 6/1988 | Wycech |
| 4,769,391 A | 9/1988 | Wycech |
| 4,810,548 A | 3/1989 | Ligon, Sr. et al. |
| 4,813,690 A | 3/1989 | Coburn, Jr. |
| 4,836,516 A | 6/1989 | Wycech |
| 4,853,270 A | 8/1989 | Wycech |
| 4,861,097 A | 8/1989 | Wycech |
| 4,901,395 A | 2/1990 | Semrau |
| 4,922,596 A * | 5/1990 | Wycech .................. 29/897.2 |
| 4,923,902 A | 5/1990 | Wycech |
| 4,978,562 A | 12/1990 | Wycech |
| 5,102,188 A | 4/1992 | Yamane |
| 5,124,186 A | 6/1992 | Wycech |
| 5,358,397 A | 10/1994 | Ligon et al. |
| 5,382,397 A | 1/1995 | Turner, Jr. |

(Continued)

FOREIGN PATENT DOCUMENTS

DE    20 17 147    11/1970

(Continued)

OTHER PUBLICATIONS

Born et al., Structural Bonding in Automotive Applications.

(Continued)

*Primary Examiner*—Monica A Huson
(74) *Attorney, Agent, or Firm*—Dobrusin & Thennisch PC

(57) ABSTRACT

In the overmoulding of an article channels are provided in the surface of the article to guide the flow of the overmoulding material, in addition holes may be provided across the article to enable flow of the overmoulding material to the side of the carrier remote from the point of injection. The techniques are particular useful in the overmoulding of articles having a lattice or honeycomb structure particularly when produced by injection moulding. When the overmoulding material is foamable the overmoulded articles may be used as acoustic baffles or structural reinforcement for automobiles.

20 Claims, 5 Drawing Sheets

U.S. PATENT DOCUMENTS

| | | | |
|---|---|---|---|
| 5,506,025 A * | 4/1996 | Otto et al. ............... 428/98 |
| 5,631,027 A | 5/1997 | Takabatake |
| 5,642,914 A | 7/1997 | Takabatake |
| 5,660,116 A | 8/1997 | Dannawi et al. |
| 5,725,272 A | 3/1998 | Jones |
| 5,753,155 A | 5/1998 | Hanusa et al. |
| 5,755,486 A | 5/1998 | Wycech |
| 5,766,719 A | 6/1998 | Rimkus |
| 5,806,915 A | 9/1998 | Takabatake |
| 5,819,408 A | 10/1998 | Catlin |
| 5,829,482 A | 11/1998 | Takabatake |
| 5,888,600 A | 3/1999 | Wycech |
| 5,904,024 A | 5/1999 | Miwa |
| 5,931,474 A | 8/1999 | Chang et al. |
| 5,937,486 A | 8/1999 | Bockenheimer |
| 5,983,674 A | 11/1999 | Marcolin et al. |
| 5,985,435 A | 11/1999 | Czaplicki et al. |
| 5,992,923 A | 11/1999 | Wycech |
| 6,003,274 A | 12/1999 | Wycech |
| 6,006,484 A | 12/1999 | Geissbuhler |
| 6,030,701 A | 2/2000 | Johnson et al. |
| 6,033,300 A | 3/2000 | Schneider |
| 6,068,424 A | 5/2000 | Wycech |
| 6,079,180 A | 6/2000 | Wycech |
| 6,092,864 A | 7/2000 | Wycech et al. |
| 6,093,358 A | 7/2000 | Schiewe et al. |
| 6,096,403 A | 8/2000 | Wycech et al. |
| 6,099,948 A | 8/2000 | Paver, Jr. |
| 6,103,341 A | 8/2000 | Barz et al. |
| 6,131,897 A | 10/2000 | Barz et al. |
| 6,146,565 A | 11/2000 | Keller |
| 6,149,227 A | 11/2000 | Wycech |
| 6,150,428 A | 11/2000 | Hanley, IV et al. |
| 6,165,588 A | 12/2000 | Wycech |
| 6,168,226 B1 | 1/2001 | Wycech |
| 6,189,953 B1 | 2/2001 | Wycech |
| 6,196,621 B1 | 3/2001 | VanAssche |
| 6,197,403 B1 | 3/2001 | Brown et al. |
| 6,199,940 B1 | 3/2001 | Hopton et al. |
| 6,207,244 B1 | 3/2001 | Hesch |
| 6,233,826 B1 | 5/2001 | Wycech |
| 6,237,304 B1 | 5/2001 | Wycech |
| 6,247,287 B1 | 6/2001 | Takabatake |
| 6,253,524 B1 | 7/2001 | Hopton et al. |
| 6,254,488 B1 | 7/2001 | Hill |
| 6,263,635 B1 | 7/2001 | Czaplicki |
| 6,270,600 B1 | 8/2001 | Wycech |
| 6,272,809 B1 | 8/2001 | Wycech |
| 6,276,105 B1 | 8/2001 | Wycech |
| 6,281,260 B1 | 8/2001 | Hanley, IV et al. |
| 6,287,666 B1 | 9/2001 | Wycech |
| 6,296,298 B1 | 10/2001 | Barz et al. |
| 6,305,136 B1 | 10/2001 | Hopton et al. |
| 6,311,452 B1 | 11/2001 | Barz et al. |
| 6,315,938 B1 | 11/2001 | Jandali |
| 6,319,964 B1 | 11/2001 | Blank et al. |
| 6,321,793 B1 | 11/2001 | Czaplicki et al. |
| 6,332,731 B1 | 12/2001 | Wycech |
| 6,341,467 B1 | 1/2002 | Wycech |
| 6,347,799 B1 | 2/2002 | Williams et al. |
| 6,358,584 B1 | 3/2002 | Czaplicki |
| 6,368,438 B1 | 4/2002 | Chang et al. |
| 6,372,334 B1 | 4/2002 | Wycech |
| D457,120 S | 5/2002 | Broccardo et al. |
| 6,382,635 B1 | 5/2002 | Fitzgerald |
| 6,383,610 B1 | 5/2002 | Barz et al. |
| 6,385,942 B1 * | 5/2002 | Grossman et al. ......... 52/798.1 |
| 6,389,775 B1 | 5/2002 | Steiner et al. |
| 6,406,078 B1 | 6/2002 | Wycech |
| 6,413,611 B1 | 7/2002 | Roberts et al. |
| 6,419,305 B1 | 7/2002 | Larsen |
| 6,422,575 B1 | 7/2002 | Czaplicki et al. |
| H2047 H | 9/2002 | Harrison et al. |
| 6,455,146 B1 | 9/2002 | Fitzgerald |
| 6,467,834 B1 | 10/2002 | Barz et al. |
| 6,471,285 B1 | 10/2002 | Czaplicki et al. |
| 6,474,722 B2 | 11/2002 | Barz |
| 6,474,723 B2 | 11/2002 | Czaplicki et al. |
| 6,475,577 B1 | 11/2002 | Hopton et al. |
| 6,478,367 B2 | 11/2002 | Ishikawa |
| 6,482,486 B1 | 11/2002 | Czaplicki et al. |
| 6,482,496 B1 | 11/2002 | Wycech |
| 6,491,336 B1 | 12/2002 | Beckmann et al. |
| 6,502,821 B2 | 1/2003 | Schneider |
| 6,519,854 B2 | 2/2003 | Blank |
| 6,523,857 B1 | 2/2003 | Hopton et al. |
| 6,523,884 B2 | 2/2003 | Czaplicki et al. |
| 6,546,693 B2 | 4/2003 | Wycech |
| 6,550,847 B2 | 4/2003 | Honda et al. |
| 6,561,571 B1 | 5/2003 | Brennecke |
| 6,573,309 B1 | 6/2003 | Reitenbach et al. |
| 6,575,526 B2 | 6/2003 | Czaplicki et al. |
| 6,607,238 B2 | 8/2003 | Barz |
| 6,619,727 B1 | 9/2003 | Barz et al. |
| 6,623,361 B1 | 9/2003 | Parsons |
| 6,634,698 B2 | 10/2003 | Kleino |
| 6,641,208 B2 | 11/2003 | Czaplicki et al. |
| 6,668,457 B1 | 12/2003 | Czaplicki |
| 6,691,468 B2 | 2/2004 | Helferty |
| 6,692,347 B1 | 2/2004 | Schneider |
| 6,708,979 B2 | 3/2004 | Stratman et al. |
| 6,729,425 B2 | 5/2004 | Schneider |
| 6,748,667 B2 | 6/2004 | Sevastian |
| 6,777,049 B2 | 8/2004 | Sheldon et al. |
| 6,786,533 B2 | 9/2004 | Bock et al. |
| 6,793,274 B2 | 9/2004 | Riley et al. |
| 6,811,864 B2 | 11/2004 | Czaplicki et al. |
| 6,820,923 B1 | 11/2004 | Bock et al. |
| 6,846,559 B2 | 1/2005 | Czaplicki et al. |
| 6,851,232 B1 | 2/2005 | Schwegler |
| 6,855,652 B2 | 2/2005 | Hable et al. |
| 6,887,914 B2 | 5/2005 | Czaplicki et al. |
| 6,890,021 B2 | 5/2005 | Bock et al. |
| 6,905,745 B2 | 6/2005 | Sheldon et al. |
| 6,920,693 B2 | 7/2005 | Hankins et al. |
| 6,921,130 B2 | 7/2005 | Barz et al. |
| 6,923,499 B2 | 8/2005 | Wieber et al. |
| 6,928,736 B2 | 8/2005 | Czaplicki et al. |
| 6,932,421 B2 | 8/2005 | Barz |
| 6,938,947 B2 | 9/2005 | Barz et al. |
| 6,941,719 B2 | 9/2005 | Busseuil et al. |
| 6,953,219 B2 | 10/2005 | Lutz et al. |
| 6,955,593 B2 | 10/2005 | Lewis et al. |
| 7,105,112 B2 | 9/2006 | Czaplicki et al. |
| 7,141,194 B1 | 11/2006 | Beckmann |
| 7,141,206 B2 | 11/2006 | Ishikawa et al. |
| 7,144,071 B2 | 12/2006 | Le Gall et al. |
| 7,160,491 B2 | 1/2007 | Barz et al. |
| 2001/0022407 A1 | 9/2001 | Beckmann |
| 2002/0053179 A1 | 5/2002 | Wycech |
| 2002/0074827 A1 | 6/2002 | Fitgerald et al. |
| 2002/0164450 A1 | 11/2002 | Lupini et al. |
| 2002/0174954 A1 | 11/2002 | Busseuil et al. |
| 2003/0057737 A1 | 3/2003 | Bock et al. |
| 2003/0140671 A1 | 7/2003 | Lande et al. |
| 2003/0148090 A1 | 8/2003 | Lewit et al. |
| 2003/0201572 A1 | 10/2003 | Coon et al. |
| 2003/0209921 A1 | 11/2003 | Coon et al. |
| 2003/0218019 A1 | 11/2003 | Le Gall et al. |
| 2004/0011282 A1 | 1/2004 | Myers et al. |
| 2004/0074150 A1 | 4/2004 | Wycech |
| 2004/0079478 A1 | 4/2004 | Merz |
| 2004/0090099 A1 | 5/2004 | Chen Shun-Min |
| 2004/0135058 A1 | 7/2004 | Wycech |

| | | | |
|---|---|---|---|
| 2004/0256888 A1 | 12/2004 | Le Gall et al. | |
| 2004/0262810 A1 | 12/2004 | Barz et al. | |
| 2005/0012280 A1 | 1/2005 | Richardson | |
| 2005/0081383 A1 | 4/2005 | Kosal et al. | |
| 2005/0082111 A1 | 4/2005 | Weber | |
| 2005/0087899 A1 | 4/2005 | Coon et al. | |
| 2005/0102815 A1 | 5/2005 | Larsen | |
| 2005/0126286 A1 | 6/2005 | Hable et al. | |
| 2005/0126848 A1 | 6/2005 | Siavoshai et al. | |
| 2005/0127145 A1 | 6/2005 | Czaplicki et al. | |
| 2005/0159531 A1 | 7/2005 | Ferng | |
| 2005/0166532 A1 | 8/2005 | Barz | |
| 2005/0172486 A1 | 8/2005 | Carlson et al. | |
| 2005/0194706 A1 | 9/2005 | Kosal et al. | |
| 2005/0212326 A1 | 9/2005 | Marion | |
| 2005/0212332 A1 | 9/2005 | Sheldon et al. | |
| 2005/0217785 A1 | 10/2005 | Hable et al. | |
| 2005/0218697 A1 | 10/2005 | Barz et al. | |
| 2005/0227042 A1 | 10/2005 | Schoemann et al. | |
| 2005/0230165 A1 | 10/2005 | Thomas et al. | |
| 2005/0251988 A1 | 11/2005 | Mendiboure | |
| 2005/0276970 A1 | 12/2005 | Busseuil et al. | |
| 2005/0285292 A1 | 12/2005 | Mendiboure et al. | |
| 2006/0000186 A1 | 1/2006 | Carlson et al. | |
| 2006/0057333 A1 | 3/2006 | Brahim | |
| 2006/0267378 A1 | 11/2006 | Czaplicki et al. | |
| 2007/0075569 A1 | 4/2007 | Barz et al. | |

FOREIGN PATENT DOCUMENTS

| | | |
|---|---|---|
| DE | 198 12 288 | 2/1998 |
| DE | 198 56 255 | 3/1998 |
| DE | 198 58 903 | 12/1998 |
| EP | 0 273 330 A3 | 6/1988 |
| EP | 0 421 277 | 4/1991 |
| EP | 0 611 778 | 1/1994 |
| EP | 0 679 501 A1 | 11/1995 |
| EP | 0 697 956 B1 | 2/1996 |
| EP | 0 891 918 | 1/1999 |
| EP | 0 893 331 | 1/1999 |
| EP | 0 893 332 A1 | 1/1999 |
| EP | 1 134 126 B1 | 3/2001 |
| EP | 1 122 156 | 8/2001 |
| EP | 1 031 496 | 12/2001 |
| EP | 0 893 332 B1 | 3/2002 |
| EP | 1 256 512 A2 | 11/2002 |
| EP | 1 359 004 | 11/2003 |
| EP | 1 362 683 | 11/2003 |
| EP | 1 362 769 | 11/2003 |
| EP | 1 428 744 | 6/2004 |
| EP | 1 475 295 | 11/2004 |
| EP | 1 484 162 A1 | 12/2004 |
| EP | 1 591 224 | 2/2005 |
| EP | 1 577 190 | 9/2005 |
| EP | 1 458 594 | 3/2006 |
| EP | 1 127 669 B1 | 4/2006 |
| EP | 1 666 228 A2 | 6/2006 |
| FR | 1 444 883 | 7/1966 |
| FR | 2605234 A1 | 10/1986 |
| FR | 2749263 | 12/1997 |
| FR | 2 780 952 | 1/2000 |
| GB | 2 083 162 A | 3/1982 |
| GB | 2370803 A | 7/2002 |
| GB | 2 375 328 | 11/2002 |
| JP | 54 106569 | 8/1979 |
| JP | 58-87668 | 6/1983 |
| JP | 7-31569 | 7/1995 |
| JP | 08 244066 | 1/1997 |
| JP | 09 057786 | 3/1997 |
| JP | 10-45031 | 2/1998 |
| JP | 10053156 | 2/1998 |
| JP | 10-71628 | 3/1998 |
| JP | 200014103 A | 5/2000 |
| JP | 2000141403 A | 5/2000 |
| JP | 2001 150461 | 2/2001 |
| JP | 2001-62833 | 3/2001 |
| JP | 2001-199362 | 7/2001 |
| JP | 02001191949 A | 7/2001 |
| JP | 2002-362412 | 12/2002 |
| SE | 519497 C2 | 3/2003 |
| WO | WO 95/32110 | 5/1995 |
| WO | WO 97/02967 | 1/1997 |
| WO | WO 97/43501 | 11/1997 |
| WO | WO 98/50221 | 5/1998 |
| WO | WO 98/36944 | 8/1998 |
| WO | WO 99/08854 | 2/1999 |
| WO | WO 99/28575 | 6/1999 |
| WO | WO 99/48746 | 9/1999 |
| WO | WO 99/50057 | 10/1999 |
| WO | WO 00/03894 | 1/2000 |
| WO | WO 00/05320 | 2/2000 |
| WO | WO 00/13958 | 3/2000 |
| WO | WO 00/37239 | 6/2000 |
| WO | WO 00/37302 | 6/2000 |
| WO | WO 00/40815 | 7/2000 |
| WO | WO 00/43254 | 7/2000 |
| WO | WO 00/46461 | 8/2000 |
| WO | WO 00/55444 | 9/2000 |
| WO | WO 01/19667 | 3/2001 |
| WO | WO 01/24989 | 4/2001 |
| WO | WO 01/54936 | 8/2001 |
| WO | WO 01/71225 | 9/2001 |
| WO | WO 01/83206 | 11/2001 |
| WO | WO 01/88033 | 11/2001 |
| WO | 02/12026 A1 | 2/2002 |
| WO | WO 03/042024 | 5/2003 |
| WO | WO 03/051676 | 6/2003 |
| WO | WO 03/061934 | 7/2003 |
| WO | WO 03/089221 | 10/2003 |
| WO | WO 03/093387 | 11/2003 |
| WO | WO 2004/067304 | 8/2004 |
| WO | WO 2004/078451 | 9/2004 |
| WO | WO 2004/113153 | 12/2004 |
| WO | WO 2005/044630 | 5/2005 |
| WO | WO 2005/077634 | 8/2005 |
| WO | WO 2005/105405 | 11/2005 |

OTHER PUBLICATIONS

Hopton et al., Application of a Structural Reinforcing Material to Improve Vehicle NVH Characteristics.
Lilley et al., Comparison of Preformed Acoustic Baffles and Two-Component Polyurethane Foams for Filling Body Cavities.
Lilley et al., A Comparison of NVH Treatments for Vehicle Floorplan Applications.
Lilley et al., Vehicle Acoustic Solutions.
Mansour et al., Optimal Bonding Thickness for Vehicle Stiffness.
Copending U.S. Appl. No. 10/718,509, filed Nov. 20, 2003.
Copending U.S. Appl. No. 10/761,635, filed Jan. 21, 2004.
Copending U.S. Appl. No. 10/839,084, filed May 5, 2004.
Copending U.S. Appl. No. 10/806,309, filed Mar. 22, 2004.
Copending Patent Application Serial No. GB 0220945.0 filed Sep. 10, 2002.
Copending Patent Application Serial No. EP 0300159.1 filed Jan. 6, 2003.
Copending U.S. Appl. No. 10/920,520, filed Aug. 18, 2004.
Copending U.S. Appl. No. 10/941,553, filed Sep. 15, 2004.
Copending U.S. Appl. No. 10/973,050, filed Oct. 25, 2004.
Copending U.S. Appl. No. 10/967,783, filed Nov. 20, 2004.
Copending U.S. Appl. No. 10/873,935, filed Jun. 22, 2004.
Copending U.S. Appl. No. 60/674,919, filed Apr. 26, 2005.
Copending U.S. Appl. No. 11/115,668, filed Apr. 27, 2005.
Copending U.S. Appl. No. 60/675,581, filed Apr. 28, 2005.
Copending U.S. Appl. No. 60/676,406, filed Apr. 29, 2005.
Copending U.S. Appl. No. 60/680,268, filed May 12, 2005.
Copending U.S. Appl. No. 11/141,280, filed May 31, 2005.

Copending U.S. Appl. No. 60/688,255, filed Jun. 7, 2005.
Copending U.S. Appl. No. 11/150,966, filed Jun. 13, 2005.
Copending U.S. Appl. No. 11/151,957, filed Jun. 14, 2005.
European Search Report dated Oct. 18, 2005. Application No. 05076317.6.
Great Britain Search Report dated Nov. 15, 2004. Application No. GB0413809.05.
UK Search Report dated Nov. 15, 2004. Application No. GB0413809.5.

* cited by examiner

OVERMOULDING

The present application claims the benefit of the filing date of U.K. Patent Application 0413809.5 (filed Jun. 21, 2004) the contents of which are hereby incorporated by reference in their entirety.

FIELD OF THE INVENTION

The present invention relates to improvements in or relating to injection moulding and in particular to the production of materials by overmoulding and to articles produced thereby.

BACKGROUND OF THE INVENTION

Overmoulding is a technique whereby a layer of material is provided over the surface of an article by placing the already formed article in a mould and injecting the material into the mould so that it forms a layer over at least part of the surface of the article. In some instances for reasons of economy and subsequent performance of the overmoulded article it is important to be able to control the location and thickness of the overmoulded layer. Furthermore, for economy and simplicity of operation it can be desirable that the material be injected into the mould through a single injection point.

The ease with which these techniques may be performed to some extent depends upon the rheology of the material that is injected, under the conditions that it is injected and the conditions prevailing in the mould. One instance in which overmoulding is used is in the provision of a layer of foamable material on the surface of a carrier. This technique is used in the production of acoustic baffles or structural reinforcement used in the manufacture of automobiles. These overmoulded articles are mounted within the frame of the automobile which is subjected to an anticorrosion treatment such as the e-coat process and then heated in an oven to dry and bake the anticorrosion coating. The foamable layer that has been provided by overmoulding is such that it will foam at the temperatures to which it is exposed in the oven.

Accordingly it is necessary that the foamable material will flow under the injection conditions and under the conditions prevailing in the mould to produce a layer of required thickness over the desired regions of the article without foaming. Furthermore it is desirable that this can be accomplished whilst the foamable material can be injected into the mould through a single injection point. This has proved extremely difficult particularly as the size of the mouldings increases. It is also a problem when overmoulding with the structural foams used to produce structural reinforcement in automobiles such as epoxy resin and polyurethane based foams which tend to have a relatively high viscosity at the conditions under which they are injection moulded.

A further difficulty that arises with mouldings of the type previously discussed is that the article which is overmoulded can itself be formed by injection moulding and where there is a need for economic reasons to provide maximum strength with minimum use of materials such as with articles are to be used to provide structural reinforcement. Accordingly the carriers tend to be designed in lattice or honeycombed or ribbed structures to provide optimum reinforcement; the ultimate structure depending upon the position within the vehicle that the article is to be located and the nature of the reinforcement to be provided. Similarly it may be required to locate the overmoulded material on only a portion of the surface of the carrier.

The lattice, honeycomb or ribbed structure that may be required in the carrier can result in the presence of local, relatively small, interconnecting locations in the carrier. If the carrier itself is formed by injection moulding it can be difficult to control the flow of the material used to make the carrier, which can result in undesirable thick spots in the carrier at these interconnecting locations. These can be wasteful in material and can also impair the flow of material that is overmoulded on the carrier.

The present invention is therefore designed to overcome one or more of the aforementioned problems and/or overcome other problems, which will become evident to the skilled artisan from the following description.

SUMMARY OF THE INVENTION

According to one aspect of the present invention, a moulding process is described. The process includes injection moulding of a layer of material over part of the surface of an article within the mould wherein channels are provided in the article to guide the material that is injected to the areas of the surface of the article to where the material is to be located. In addition, the channels can include one or more holes passing through the article which enable the material being injected to pass through the article to the side remote from the position at which the material is injected into the mould.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE INVENTION

Figure 1:
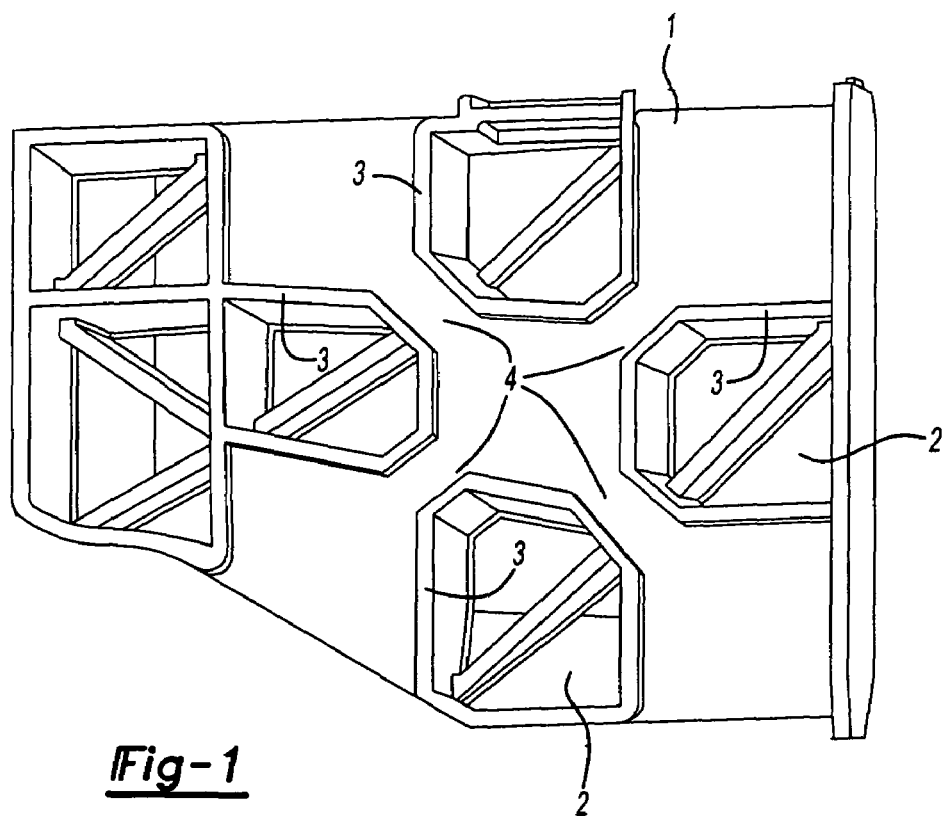
FIG. 1 shows an exemplary carrier suitable for overmoulding according to an aspect of the present invention.

The present invention provides a process wherein a material is injection moulded to provide a layer of material over part of the surface of an article within the mould wherein channels are provided on the surface of the article to guide the material that is injected to the areas of the surface of the article where the material is to be located and wherein at least some of the channels comprise one or more holes passing through the article which enable the material being injected to pass through the article to the side remote from the position at which the material is injected into the mould.

In a further embodiment the article which is to be overmoulded has a lattice structure with interconnecting locations and channels are provided to guide the material being injected over the interconnecting locations. In a further preferred embodiment at least one of the holes is provided at an interconnecting location.

In a further embodiment of the invention in which the article which is to be overmoulded has a lattice or honeycomb structure with interconnecting locations and the article which is to be overmoulded is also formed by injection moulding the mould used in the production of the article is such that holes passing through the article are formed at one or more of the interconnecting locations. Typically such holes may be formed by transverse rods provided in the mould which prevent the formation of thick points at the interconnecting locations.

Accordingly in a preferred embodiment of the present invention the article to be overmoulded has a lattice or honeycomb structure with interconnecting locations the interconnecting locations being defined by walls defining a channel for flow of the material to be overmoulded wherein the channel is provided with a hole passing from one side of the carrier through to the other side. In a further preferred embodiment the carrier is provided with several such channels some or all of which are provided with holes passing from one side of the carrier through to the other.

The various features of the present invention therefore allow the production of overmouldings of complex structure having well controlled thickness of both the carrier and the overmoulded material. The techniques also allow the injection overmoulding of relatively large articles in moulding operations that use a single injection point.

Furthermore, the techniques enable the production of overmouldings based on a carrier having a lattice or honeycomb type structure with a more uniform distribution of the overmoulded material and in addition, where the carrier itself is formed by injection moulding the present invention in a particular embodiment enables more uniform moulding of the lattice or honeycomb structure.

The presence of the holes is beneficial in enabling a moulding operation employing a single injection point. Furthermore, the presence of the holes does not necessarily result in a weakening of the structure since the holes may be filled by the material that is overmoulded. In fact if the material remains in the holes it can provide additional reinforcement by way of forming transverse ribs within the structure. This can be particularly beneficial when the material that is overmoulded is a structural foam such as an epoxy resin or polyurethane based foam since transverse rods of rigid foam will be provided within the carrier providing additional strength to the finished article. The location, dimensions and direction of the holes within the carrier may be selected to not only enhance the flow of the overmoulded material but also to provide further reinforcement and strength in a particular, desired location and also in a particular direction.

Where the present invention is used to produce acoustic baffles such as for automobiles the overmoulded material will be a heat activated, thermally expanding material which provides sound absorption material, a consideration involved with the selection and formulation of the expandable material is the temperature at which a material reaction or expansion, and possibly curing, will take place. For instance, in most applications, it is undesirable for the material to be reactive at room temperature or otherwise at the ambient temperature in a production line environment. More typically, the material becomes reactive at higher processing temperatures, such as those encountered in an automobile assembly plant, when the material is processed along with the vehicle components at elevated temperatures or at higher applied energy levels, e.g., during e-coat. While temperatures encountered in an automobile e-coat operation may be in the range of about 145° C. to about 210° C., primer, filler and paint shop applications are commonly about 93.33° C. or higher. The material is therefore selected according to the performance required in these operations. If needed, blowing agent activators can be incorporated into the composition to cause expansion at required temperatures.

Generally, suitable expandable foams have a range of expansion ranging from approximately 100 to over 1000 percent. The level of expansion of the acoustical foam may be increased to as high as 1500 percent or more.

Moreover, the sound absorption material may include a melt-flowable material such as that disclosed in U.S. Pat. No. 6,030,701.

In the production of acoustic baffles the article or substrate is preferably an unfoamable material that supports the foamable material. Typically the substrate is a harder higher melting thermoplastic such as polyamide, which may be filled usually with glass fibre or polypropylene.

The present invention may also be used in the production of parts for the structural reinforcement of hollow sections in automobiles. Here the outer foamable layer is generally a rigid reinforcing thermosetting layer such as a foamable epoxy resin or a foamable polyurethane. The foamable material is generally supported on a rigid reinforcing carrier or substrate. In this instance the foamable material serves two main functions, it will expand across the space between the reinforcing member and the interior of the hollow section and will bond to some or all of the interior walls of the hollow section. Accordingly, expandable adhesive material means that the material can be activated to both expand (typically foam) and to act as an adhesive. Activation therefore enables the expandable material to expand and fill a gap between the reinforcing member and a hollow structure it is designed to reinforce and to bond to selected internal surfaces of the hollow structure. Accordingly the expandable adhesive must expand at the desired temperature and be sufficiently adhesive to firmly bond the reinforcing member inside the vehicle structure. Once foamed it should be sufficiently strong that it does not contribute any weakness to the overall reinforcing effect provided.

Prior to activation, the expandable adhesive material is preferably dry and not tacky to the touch, since this facilitates shipping and handling and prevents contamination. Examples of preferred foamable materials include foamable epoxy-base resins and examples of such materials are the products L5206, L5207, L5208 and L5209, which are commercially available from L & L Products of Romeo Mich. USA, and the Core Products 5204, 5206, 5205 and 5208 available from Core Products, Strasbourg, France. The product should be chosen according to the rate of expansion and foam densities required. It is further preferred that it expand at the temperatures experienced in the oven use to cure the anticorrosion coating deposited in the e-coat process, typically 130° C. to 150° C.

In these reinforcing parts the article carrier or a substrate is usually formed from a rigid polymer such as glass fibre reinforced polyamide or polypropylene. Polyamides, particularly glass filled polyamides are suitable materials due to their high strength to weight ratio. It is preferred that the moulding is provided with means enabling fluid drainage when installed in a vehicle. For example, holes may be provided in the moulding to allow the drainage of water, which may condense in the structure over time.

Whilst the invention is applicable to the production of a wide variety of materials it is particularly suitable for the production of reinforcing parts or acoustic insulating parts for automobiles, aircraft, ships, trains and other vehicles.

Structural reinforcement can be provided by the provision of a reinforcing member within a hollow structure such as part of an automotive frame. It is known that the reinforcing member may comprise a core, typically a hollow core carrying a structural adhesive foam. In the known processes the foam is expanded when heated to bridge the small gap between the core and the hollow structure so that the core is bonded to the hollow structure. Typically, as with the acoustic material previously described, the nature of the structural adhesive foam is chosen so that it expands at the temperatures used to bake the coating that is applied to the hollow structure during the e-coat anti-corrosion coating technique widely used in the automobile industry.

The trends in motor vehicle design are towards lighter vehicles to improve fuel consumption. At the same time the safety standards and requirements are becoming more rigorous as indicated by the European Union requirements and the Euro-NCAP impact testing. The use of lighter materials such as aluminum to produce the hollow cross-sectional members that are used as vehicle sub frames has lead to the need for additional reinforcement. There is also a need for reinforcement behind external panels in various locations in the vehicle such as in window and door surrounds particularly in cavities between window and door frames and external panels such as in the reinforcement of hatchback doors and windscreen pillars where they connect with the roof of the vehicle. The present invention may be used to produce parts that can provide such reinforcement.

There are four main types of application where structural reinforcement is required in vehicles. Crash protection where the prevention of vehicle body deformation is important to provide protection for the occupants. Energy absorption to enhance performance after yield. The reduction of flexing or body movement in the vehicle structure particularly to improve durability and reduce stress cracking and the point mobility problems requiring the reduction of resonance by the provision of stiffening. The need for reinforcement is present irrespective of the materials that are used to produce the vehicle structure and the need varies from material to material according to the nature of the reinforcement that is being provided. The reinforcing parts can also reduce the noise created by the motion of a vehicle by having a sound deadening effect as a result of blocking air paths in cavities.

The reinforcing parts are typically placed in the body in white in the same manner as described in relation to acoustic baffles. Accordingly comparable performance in relation to the electrocoat process is required. The reinforcing structures are preferably provided within hollow sections prior to the electrocoat. It is therefore important that the reinforcing structure have minimal impact on the operation and efficiency of the electrocoat process. The structural reinforcing member needs to be located within the hollow section to be reinforced in a manner that enables satisfactory performance of the e-coat process without undesirable movement of the structural reinforcing member. Various means of attachment can be provided for example means such as clips may be moulded in the substrate which can be clipped into holes formed in the walls of the hollow section other than the wall or walls which constitute the external panel. Similarly attachment means such as clips may be formed in the walls of the hollow section, other than the external panel, which can fit into holes in the core of the reinforcing member. Alternatively or additionally the structural reinforcing member may be provided with small lugs, which enable it to stand away from the interior walls of the hollow structure. In this way fastening devices may not be required and the area of contact between the structural reinforcing member and the interior walls of the frame of the vehicle is minimized.

The clearance between the extremity of the reinforcing member and the interior walls of the hollow section should be wide enough to enable the liquid used in the electrocoat bath to flow between the reinforcing member and the interior walls of the sections of the vehicle in sufficient quantity to enable an effective anti-corrosion coating to be deposited. On the other hand, the clearance must not be too wide since this can result in a lack of rigidity in the structure when the expandable adhesive is foamed to bond the structural reinforcing member to the walls of the hollow section other than the external panel. We prefer that the clearance be no more than 1 centimeter and is more preferably 3 to 10 millimeters. The clearance around the whole structure enables a more uniform foam structure to be obtained.

The dimensions of the rigid reinforcing member and the thickness, location and nature of the expandable material are important for the achievement of the desired structural reinforcement. The exterior shape of the reinforcing member should conform substantially to the cross section of the section of the structure it is designed to reinforce. The shape of the reinforcing member may vary along its length as the dimensions of the cross section of the structure change. The size of the reinforcing member including the expandable adhesive material should be such that there is a small clearance between the extremity of the reinforcing member and the interior walls of the structure to be reinforced to allow for passage of the electrocoat fluid. The foam should contact and bond to other surfaces of the hollow structure so that the rigid reinforcing member is held firmly within the structure. The reinforcing member may have a cellular, honeycomb or ribbed internal structure to provide reinforcement along several different axes and this structure may be provided in the moulding of the substrate.

If other components for example bolts are to pass through the reinforcing members during subsequent assembly care must be taken to ensure that holes formed in the reinforcing member for the passage of the bolts are not blocked by the foam as it expands.

Figure 2:
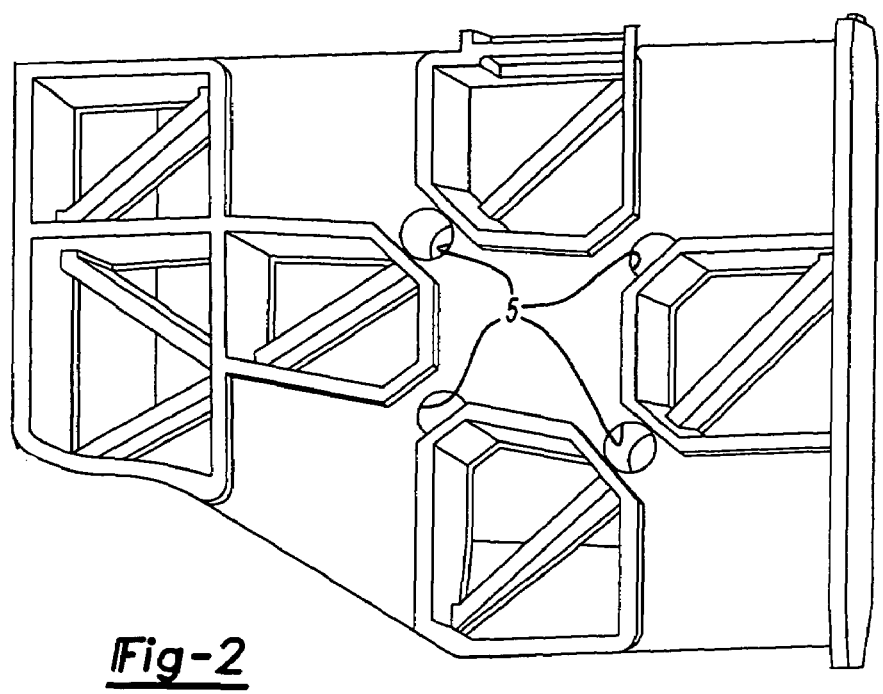
FIG. 2 shows another exemplary carrier suitable for overmoulding according to the present invention.

The present invention is illustrated by reference to the accompanying drawings in which FIG. 1 shows part of a carrier material (article) suitable for overmoulding provided with channels to guide the flow of the overmoulded material and FIG. 2 shows the carrier to that of FIG. 1 provided with holes passing from a side of the carrier to the other according to the present invention.

Figure 3:
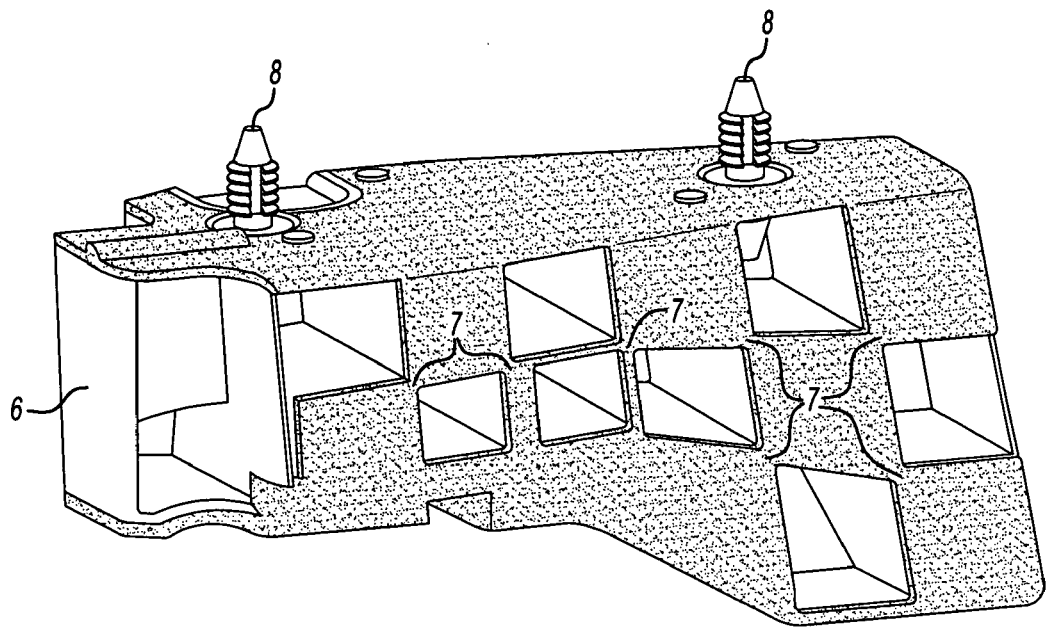
FIGS. 3 and 3a show sides of an exemplary part for reinforcement of a vehicle according to an aspect of the present invention.
Figure 3A:
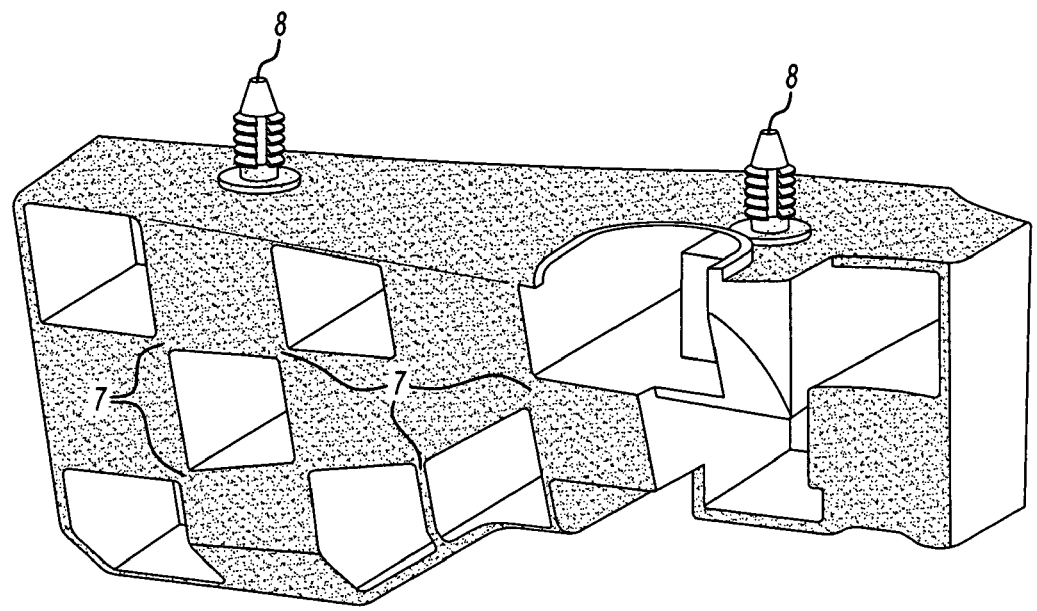

FIGS. 3 and 3a are comparative and show the two sides of a part for reinforcement of a vehicle having a lattice structure with no channels and no holes.

Figure 4:
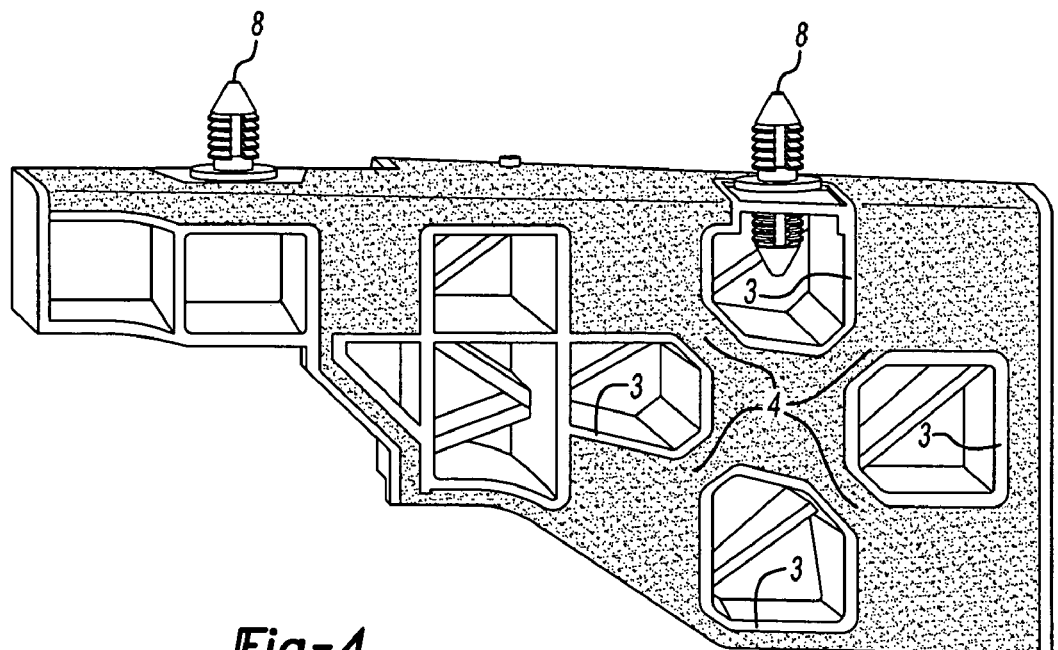
FIG. 4 and FIGS. 5 and 5a illustrate various aspects of an exemplary part in accordance with an aspect of the present invention.
Figure 5:
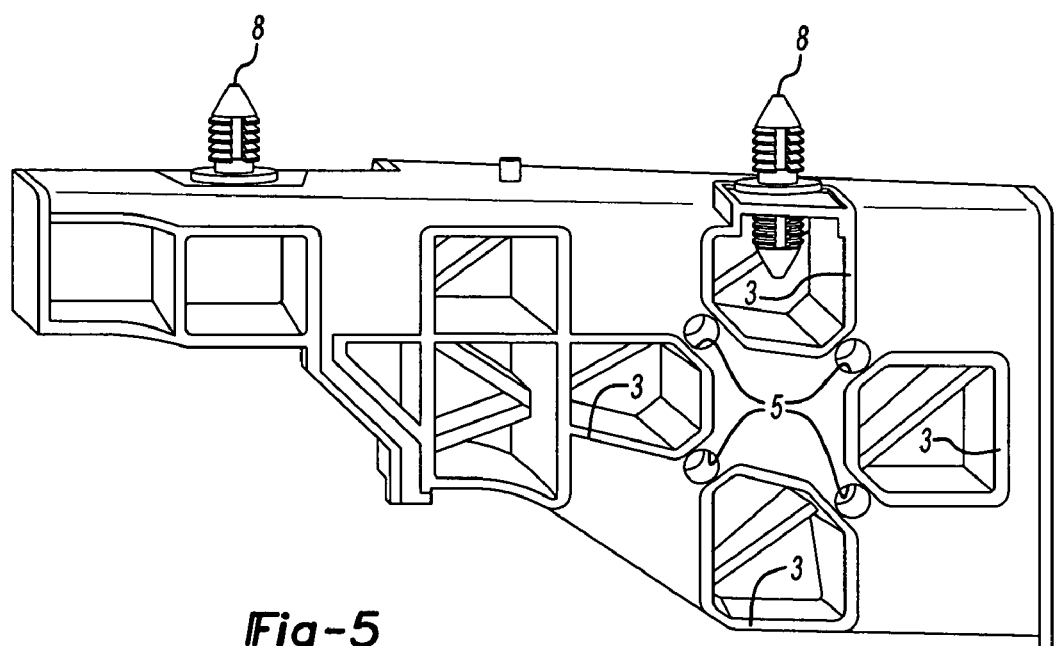
Figure 5A:
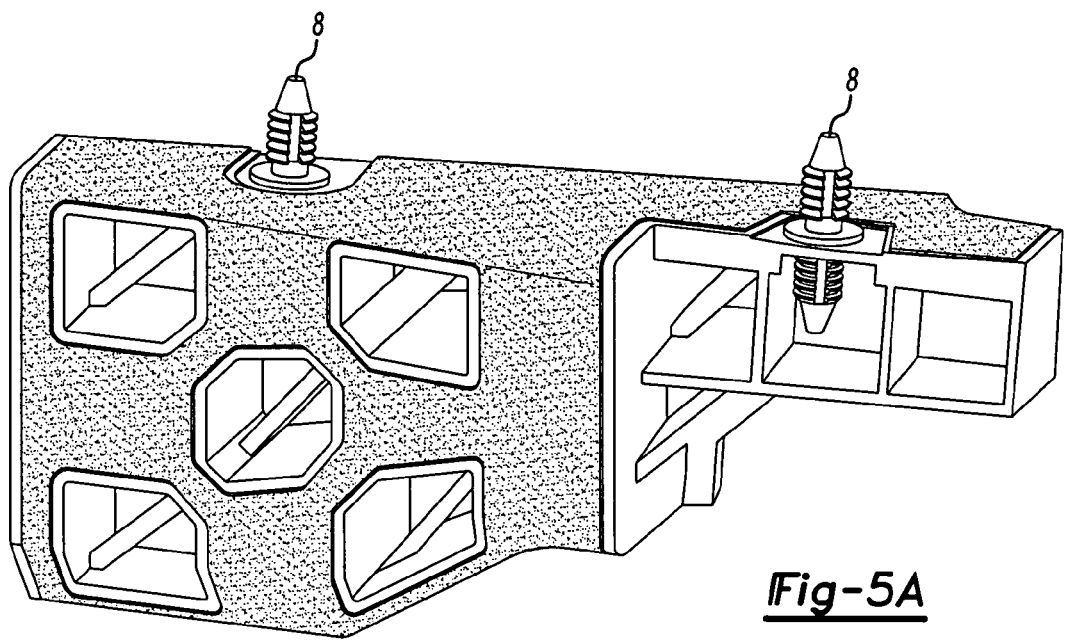

FIG. 4 shows a similar part to that shown in FIG. 3 and provided with channels and FIGS. 5 and 5a shows both sides of the part shown in FIG. 4 and illustrate the provisional of holes according to the present invention.

Figure 6:
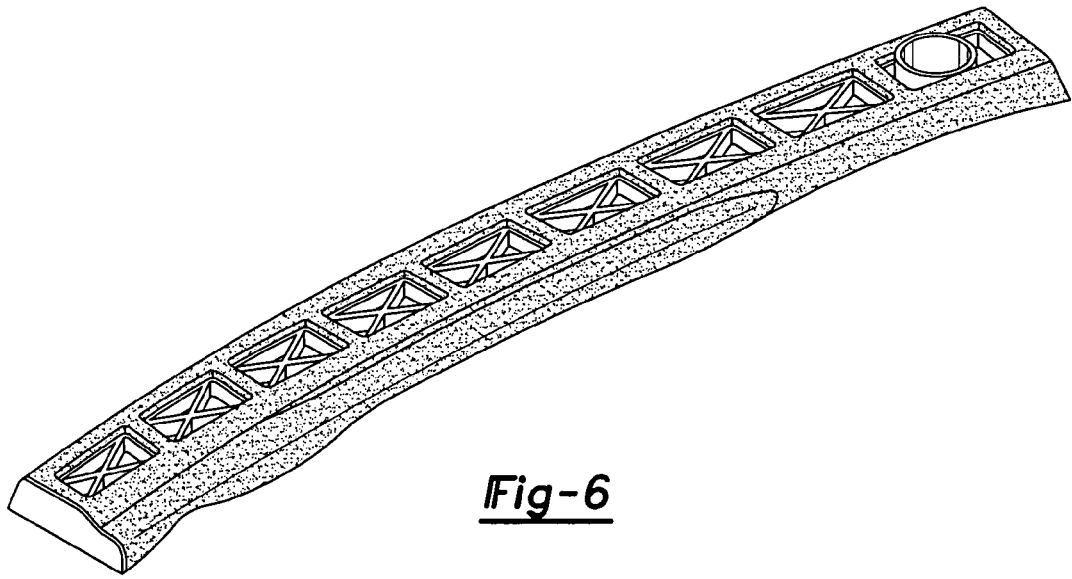
FIG. 6 and FIG. 7 show opposite sides of an exemplary part in accordance with an aspect of the present invention.
Figure 7:
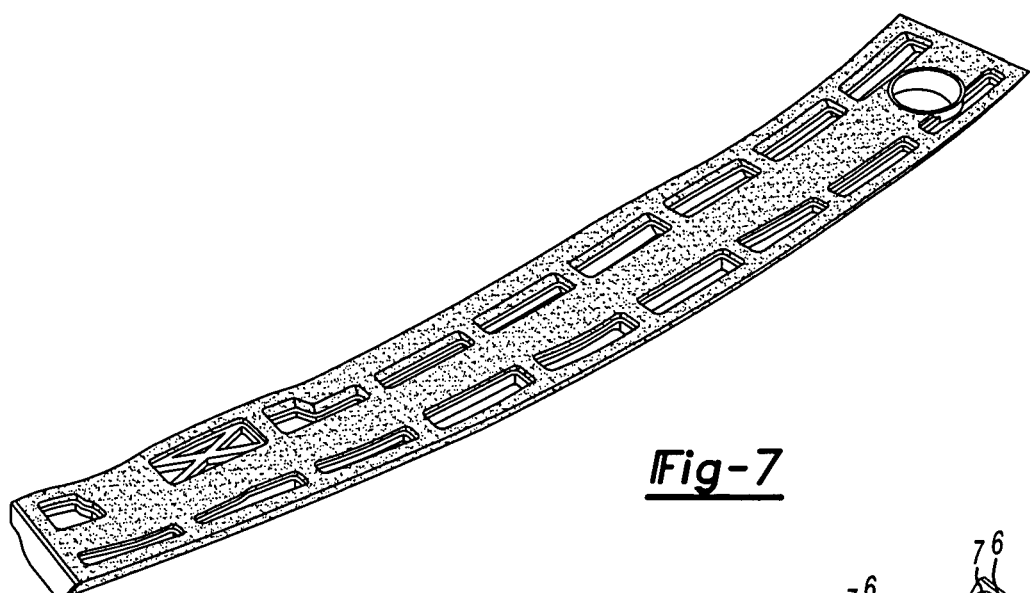

FIGS. 6 and 7 show opposite sides of a different moulding comprising a carrier overmoulded with foam according to the present invention.

Figure 8:
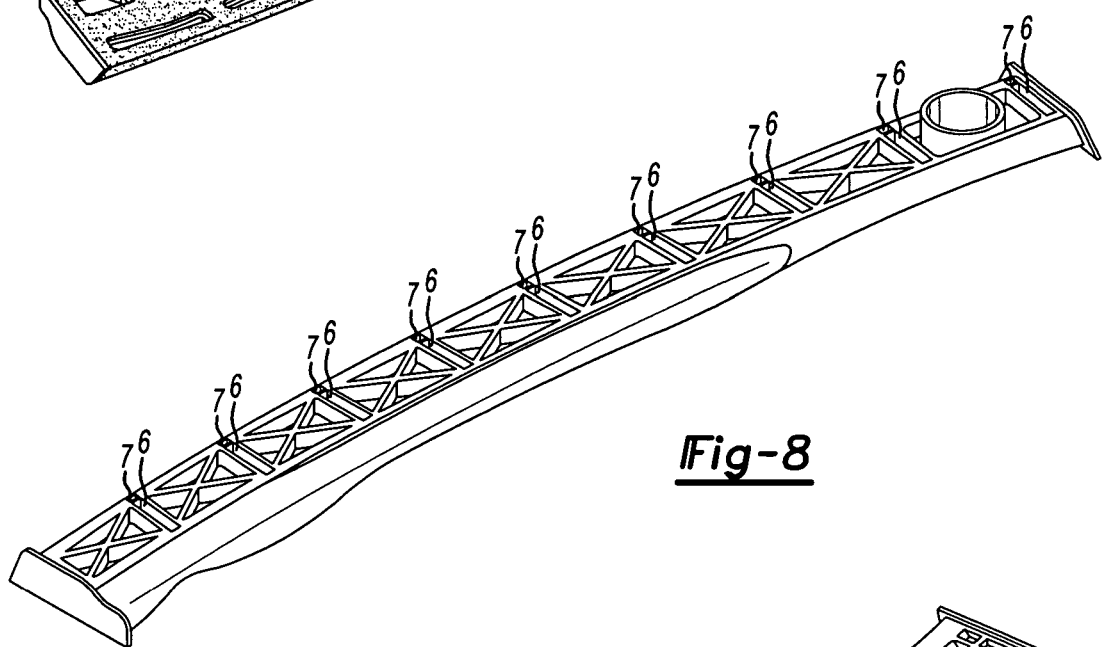
FIG. 8 and FIG. 9 show exemplary mouldings of FIGS. 7 and 8 without material overmoulded thereon.
Figure 9:
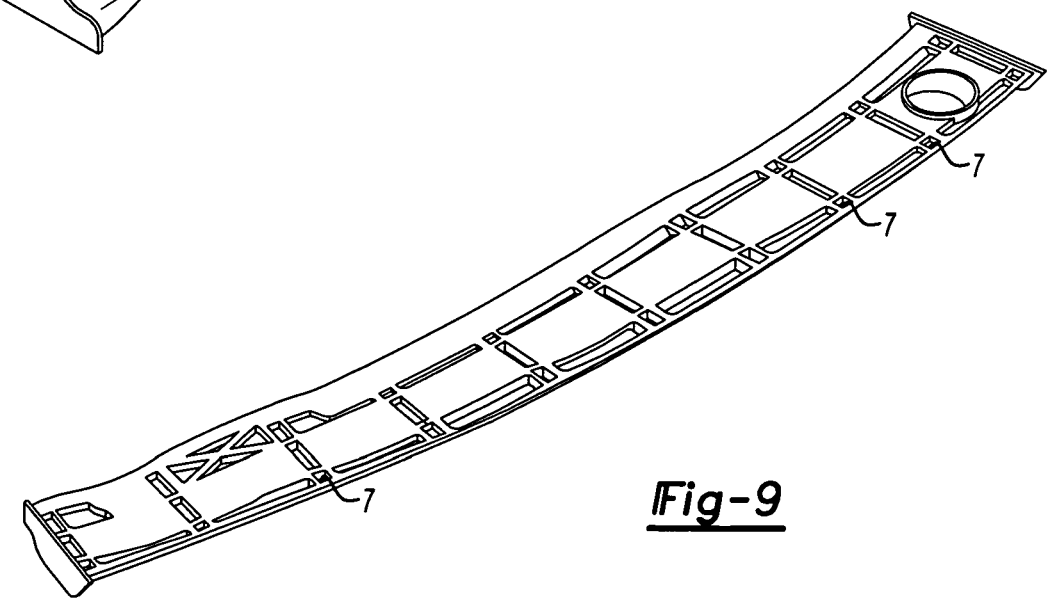

FIGS. 8 and 9 show the mouldings of FIGS. 7 and 8 without the foam overmoulding.

Referring to FIG. 1 a carrier (1) is shown to have a lattice structure with open areas (2) and is provided with walls (3) which form channels (4) at the interconnecting locations of the lattice structure. The walls are also shaped so that they will guide the flow of overmoulded material through the channels. FIG. 2 shows the carrier of FIG. 1 in which the through holes (5) are provided. As can be seen in FIG. 5A, the expandable material, after moulding, can be flush with the top of the sidewalls of the channels.

FIGS. 3 and 3*a* show two sides of an overmoulded carrier (6) and illustrate the small interconnecting areas of the lattice (7) which create the difficulties for moulding and overmoulding the carrier. FIG. 4 shows a moulding similar to that of FIG. 3 provided with the walls (3) as in FIG. 1 to form channels (4) for the flow of the overmoulded material and FIG. 5 shows the carrier of FIG. 4 provided with through holes (5) in the channels (4) according to the present invention FIG. 5*a* shows the reverse side of FIG. 5 overmoulded with foamed material.

FIGS. 6 and 7 show both sides of an elongated overmoulding that can be produced according to the present invention and FIGS. 8 and 9 show the moulding of FIGS. 6 and 7 without the overmoulded foam showing the channels (6) and the holes (7) for flow of the overmoulded material.

The mouldings of FIGS. 3 to 7 are shown provided with means for attachment (8) to the interior of an automotive body.

We have found that the techniques of the present invention have allowed the production of articles overmoulded with foamable material at a substantially constant thickness of between 2 to 3 millimeters which has hitherto been difficult to achieve. We have also found that the techniques allow the foamable material to be evenly distributed over those surfaces of the carrier where it is desired to provide foamable material using a single injection point mould. We have also found that the provision of the holes has enabled a reduction in the thickness of the carrier material at and around the intersecting locations of a lattice or honeycomb structure moulding.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A moulding process, comprising:
   injection molding an article from a thermoplastic material selected from polyamide or polypropylene, wherein:
   i) the article includes channels and one or more traverse holes passing through the article;
   ii) the channels are provided on the surface of the article and the channels are defined by the surface of the article and spaced apart side walls;
   iii) the article has a lattice or honeycomb structure with a plurality of interconnecting locations and at least one of the one or more holes is located at least one of the interconnecting locations;
   iv) at least one of the one or more holes passes transversely through the article from one side of the article to another side of the article;
   v) the article has a plurality of spaced apart external surfaces that are separated by open areas and are interconnected at the interconnecting locations; and
   vi) the article includes clips for attachment to an interior wall of the structure to be reinforced prior to activating the material;
   injection overmoulding the material as a layer over part of the surface of an article onto the spaced apart external surfaces within the mould for forming a moulding as a reinforcement member, wherein:
   i) the material is heat activated structural foamable material;
   ii) the channels guide the heat activated structural foamable material that is injected to areas of the surface of the article where the heat activated structural foamable material is to be located;
   iii) the one or more holes passing through the article enable the heat activated structural foamable material being injected to pass through the article to the side remote from a position at which the heat activated structural foamable material is injected into the mould wherein the heat activated structural foamable material is then guided through the channels over a substantial portion of the surface of the article while avoiding flow of the heat activated structural foamable material over other portions of the surface of the article;
   iv) the moulding is a baffle or reinforcement configured for an automobile;
   v) the injection overmoulding operation employs a single injection point
   vi) the other portions of the surface of the article are adjacent the channels;
   vii) the article is provided as a high strength plastic moulding;
   viii) the reinforcement member has an exterior shape that varies along a length of the reinforcement member as the dimensions of the cross section of the structure change such that the reinforcement member substantially conforms to the cross section of the structure that the reinforcement member is designed to reinforce;
   ix) the size of the reinforcing member including the heat activated structural foamable material is such that there is a small clearance between the extremity of the reinforcing member and the interior walls of the structure to be reinforced so that upon foaming of the heat activated structural foamable material, the heat activated structural foamable material adheres to the interior walls of the structure to be reinforced;
   x) the interconnecting locations are defined by walls defining a interconnecting channel for flow of the heat activated structural foamable material and wherein the interconnecting channel is provided with a hole passing from one side of the article through to the other side of the article; and
   xi) the one or more transverse holes being filled with the heat activated structural foamable material to form transverse reinforcing rods.

2. A process according to claim 1 wherein the interconnecting locations guide the heat activated structural foamable material to the channels defined by the spaced apart side walls.

3. A process according to claim 1 wherein the article is also formed by injection moulding and a mould used in the production of the article is such that holes of the one or more holes passing through the article are formed at one or more of the interconnecting locations.

4. A process according to claim 3 wherein the heat activated structural foamable material is selected from the group consisting of a foamable epoxy resin or polyurethane based foamable that, upon foaming, forms a structural foam.

5. A process according to claim 1 wherein the other portions include at least one opening, the at least one opening being free of the heat activated structural foamable material.

6. A process according to claim 5 wherein the at least one opening is at least one through hole that passes through the article to the remote side of the article, the at least one through hole being free of the heat activated structural foamable material.

7. A process according to claim 5 wherein the heat activated structural foamable material, after moulding and while still within the mould, is flush with the top of the sidewalls of the channels.

8. A moulding process, comprising:
providing an expandable material, an article and a mould wherein the article includes channels and one or more holes passing through the article and wherein the article is shaped to correspond to a cavity of an automotive vehicle and wherein the expandable material is configured to foam at a temperature experienced in an e-coat or paint operation of the automotive vehicle thereby forming a structural foam;
injection moulding the expandable material as a layer over a substantial portion of a surface of the article within the mould for forming a moulding wherein:
  i) the channels are defined by the surface of the article and side walls;
  ii) the channels guide the material that is injected to areas of the surface of the article where the material is to be located;
  iii) the one or more holes passing through the article enable the material being injected to pass through the article to the surface of the article, which is on a side remote from a position at which the material is injected into the mould wherein the expandable material is then guided through the channels over the substantial portion of the surface of the article while avoiding flow of the expandable material over other portions of the surface of the article;
  iv) the article has a lattice or honeycomb structure and the channels define interconnecting locations and holes of the one or more holes passing through the article are formed at one or more of the interconnecting locations; and
  v) the moulding is a structural reinforcement configured for a hollow section in the automotive vehicle;
  vi) the other portions of the surface of the article are adjacent the channels and adjoining the side walls; and
  vii) the expandable material, after moulding and while still within the mould, is flush with the top of the sidewalls of the channels.

9. A process according to claim 8 wherein the moulding operation employs a single injection point.

10. process according to claim 8 wherein the other portions include at least one through hole that passes through the article to the opposite side of the article, the at least one through hole being free of expandable material.

11. A process according to claim 10 wherein the article is provided as a high strength plastic moulding that forms a reinforcement member with the expandable material and wherein the reinforcement member has an exterior shape that varies along a length of the reinforcement member as the dimensions of the cross section of the structure change such that the reinforcement member substantially conforms along an extremity of the reinforcement member to the cross section of the structure that the reinforcement member is designed to reinforce and wherein the size of the reinforcing member including the expandable adhesive material is such that there is a small clearance between the extremity of the reinforcing member and the interior walls of the structure to be reinforced, the small clearance being less than 1 cm so that upon foaming of the expandable material, the expandable material adheres to the interior walls of the structure to be reinforced.

12. A moulding process, comprising:
providing an expandable material, an article and a mould wherein the article includes channels and one or more holes passing through the article from a first surface of the article to a second surface of the article and wherein the article is shaped for insertion into a hollow structure of an automotive vehicle; and
injection moulding the expandable material as a layer over a substantial portion of the first and second surfaces of the article within the mould for forming a moulding as a reinforcement member, wherein:
  i) the channels include at least one channel that is defined by the first surface of the article and side walls and at least one channel that is defined by the second surface of the article and side walls;
  ii) the channels guide the material that is injected to areas of the first and second surfaces of the article where the material is to be located;
  iii) the one or more holes passing through the article enable the material being injected to pass from the first surface of the article through the article to the second surface of the article, which is on a side remote from a position at which the material is injected into the mould wherein the expandable material is then guided through the channels over the substantial portion of the first and second surfaces of the article while avoiding flow of the expandable material over other portions of the first and second surfaces of the article;
  iv) the other portions of the first and second surfaces of the article are adjacent the respective first and second channels;
  v) the expandable material foams and adheres to interior walls that define the hollow structure at higher energy levels applied during automotive processing;
  vi) the article is provided as a high strength plastic moulding;
  vii) the reinforcement member has an exterior shape that varies along a length of the reinforcement member as the dimensions of the cross section of the structure change such that the reinforcement member substantially conforms to the cross section of the structure that the reinforcement member is designed to reinforce; and
  viii) the size of the reinforcing member including the expandable adhesive material is such that there is a small clearance between the extremity of at least a portion of the first and second surfaces of the reinforcing member and the interior walls of the structure to be reinforced so that upon foaming of the expandable material, the expandable material adheres to the interior walls of the structure to be reinforced.

13. A process according to claim 12 wherein the article has a lattice or honeycomb structure with interconnecting locations, the interconnecting locations being defined by walls that define an interconnecting channel for flow of the material wherein the interconnecting channel is provided with a hole passing from the first surface on one side of the article through to the second surface on other side of the article.

14. A process according to claim 12 wherein the article is provided with the channels, some or all of which are provided with holes of the one or more holes passing from the first surface on one side of the article through to the second surface on the other side of the article.

15. A process according to claim 14 wherein the moulding operation employs a single injection point.

16. A process according to claim 12 wherein the expandable material is selected from the group consisting of a foamable epoxy resin or polyurethane based foamable that, upon foaming, forms a structural foam and the article is formed from a rigid polymer such as glass fibre reinforced polyamide or polypropylene.

17. A process according to claim 12 wherein the moulding is an acoustic baffle configured for an automobile wherein the overmoulded material is a heat activated, thermally expanding material, which provides sound absorption material.

18. A process according to claim 12 wherein the other portions include at least one through hole that passes from the first surface of the article through the article to the second surface of the article, the at least one through hole of the other portions being free of expandable material.

19. A process according to claim 18 wherein the expandable material, after moulding and while still within the mould, is flush with the top of the sidewalls of the channels.

20. A process according to claim 19 wherein the small clearance is less than 1 cm.

* * * * *